US009454388B2

(12) United States Patent
Han et al.

(10) Patent No.: US 9,454,388 B2
(45) Date of Patent: *Sep. 27, 2016

(54) INFORMATION PROCESSING DEVICE, INFORMATION PROCESSING SYSTEM, AND RECORDING MEDIUM

(71) Applicant: RICOH COMPANY, LTD., Tokyo (JP)

(72) Inventors: Xiaofeng Han, Kanagawa (JP); Tsutomu Ohishi, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/530,284

(22) Filed: Oct. 31, 2014

(65) Prior Publication Data

US 2015/0057990 A1 Feb. 26, 2015

Related U.S. Application Data

(62) Division of application No. 12/840,541, filed on Jul. 21, 2010, now Pat. No. 8,903,704.

(30) Foreign Application Priority Data

Jul. 24, 2009 (JP) .................................. 2009-172966
Feb. 26, 2010 (JP) .................................. 2010-043284

(51) Int. Cl.
*G06F 9/455* (2006.01)
*G06F 9/54* (2006.01)
*G06F 11/36* (2006.01)

(52) U.S. Cl.
CPC .............. *G06F 9/455* (2013.01); *G06F 9/542* (2013.01); *G06F 11/3664* (2013.01); *G06F 2209/544* (2013.01); *G06F 2209/545* (2013.01)

(58) Field of Classification Search
CPC ............. G06F 11/261; G06F 17/5027; G06F 11/3636; G06F 17/5022; G06F 9/45533
USPC ....................................................... 703/23, 24
See application file for complete search history.

(56) References Cited

U.S. PATENT DOCUMENTS

| 7,904,914 B2 * | 3/2011 | Green | G06F 9/45533 |
| | | | 703/23 |
| 2006/0170984 A1 * | 8/2006 | Matsuda | G06K 9/2063 |
| | | | 358/462 |

FOREIGN PATENT DOCUMENTS

| JP | 2003-114592 | 4/2003 |
| JP | 2004-252585 | 9/2004 |
| JP | 2004-312711 | 11/2004 |

*Primary Examiner* — Saif Alhija
(74) *Attorney, Agent, or Firm* — Oblon, McClelland, Maier & Neustadt, L.L.P.

(57) ABSTRACT

In an information processing device connected to an external device via a network, the external device includes an application platform of an image forming device and the information processing device includes a platform emulator that emulates the application platform. The platform emulator includes an implementing information acquiring part that receives a list of information items of interfaces implemented on the application platform in the external device from the external device and stores the list of information items in a holding part, a determining part that determines, in response to an interface calling request from an application using the platform emulator, whether an interface is implemented in the external device based on the stored list of information items, and an external calling part that transmits, when the interface is implemented, a request of execution of the interface to the external device.

14 Claims, 9 Drawing Sheets

```
public interface scan{
        public void bbb();

public void ccc(int a);

public void ddd(int a, String b);

public String eee(int a, String b);

public boolean fff(boolean a);
}
```

INFORMATION PROCESSING DEVICE, INFORMATION PROCESSING SYSTEM, AND RECORDING MEDIUM

CROSS-REFERENCE TO RELATED APPLICATIONS

This application is a divisional application of and claims the benefit of priority from U.S. application Ser. No. 12/840,541, filed Jul. 21, 2010, and which claims the benefit of priority from Japanese Patent Application No. 2010-043284 filed Feb. 26, 2010, and Japanese Patent Application No. 2009-172966 filed Jul. 24, 2009; the entire contents of each of the above are incorporated herein by reference.

BACKGROUND OF THE INVENTION

1. Field of the Invention

This invention relates to an information processing device, an information processing system, and a computer-readable recording medium which are adapted to emulate an application platform of an image forming device.

2. Description of the Related Art

In recent years, an image forming device of a certain type, such as a multifunctional peripheral, is provided with an application platform, and the application platform is provided with APIs (application programming interfaces) which have been made public. Using this application platform, a third vendor develops applications and provide such applications to the market. A user of an image forming device can purchase some of the developed applications that are appropriate for his business, and can increase the efficiency of the business by installing the applications in the image forming device.

Similar to other general-purpose software programs, upgrading of the application platform is performed for the purpose of functional enhancement. There is also a case in which a completely new application platform in which a software architecture is fundamentally improved is developed.

When an upgraded application platform or a new application platform in which the software architecture is completely reformed (either of which will be called a new version platform) is released, it is desirable that applications which operate on the new version platform are ready for being provided to the market at the timing of releasing of the new version platform. In order to attain the goal, it is necessary for the third vendor to carry out the testing (or verification of operation) of the existing applications on the new version platform and the development work of a new application which operates on the new version platform, concurrently with the development of the new version platform.

Conventionally, in order to facilitate the development work, an emulator of the new version platform which operates on a PC (personal computer) has been supplied to the third vendor. The third vendor has conducted the testing or development of an application by using such an emulator. For example, Japanese Laid-Open Patent Publication No. 2004-252585 discloses a program verification system which includes an in-circuit emulator (ICE) that emulates operation of an actual device.

However, the emulator merely acts on the application similar to the way the new version platform acts on the application, and the process which is performed in response to the call of the API is a dummy process. Therefore, the testing or development of an application on the emulator does not guarantee operation of the application with a high level of accuracy.

The testing of an application using such an emulator does not contribute to the testing of the new version platform at all, and there is a problem in that the development work is inefficient. If the testing of an application can be performed directly on the new version platform in the middle of development, both the application and the new version platform can be tested at once and the development work can be performed efficiently.

However, the manufacturers of image forming devices are hard to accept releasing of the new version platform to third vendors because there is a possibility of the outflow of their own software properties. For example, when a new version platform written in Java (registered trademark) language is implemented, one can easily decipher the byte codes of the new version platform.

SUMMARY OF THE INVENTION

In one aspect, the present disclosure provides an information processing device which can increase appropriately the efficiency of the development work of both an application platform of an image forming device and an application which operates on the application platform.

In an embodiment, the present disclosure provides an information processing device which is connected to an external device via a network, the external device including an application platform of an image forming device, and the information processing device including a platform emulator that emulates the application platform of the image forming device, the platform emulator including: an implementing information acquiring part to receive a list of information items of interfaces implemented on the application platform in the external device from the external device via the network and store the list of information items in an implementing information holding part; a determining part to determine, in response to an interface calling request from an application that uses the platform emulator, whether an interface is implemented in the external device based on the list of information items stored in the implementing information holding part; and an external calling part to transmit, when it is determined that the interface is implemented, a request of execution of the interface to the external device via the network.

Other objects, features and advantages of the present disclosure will become more apparent from the following detailed description when read in conjunction with the accompanying drawings.

DETAILED DESCRIPTION OF THE PREFERRED EMBODIMENTS

A description will be given of embodiments of the present disclosure with reference to the accompanying drawings.

Figure 1:
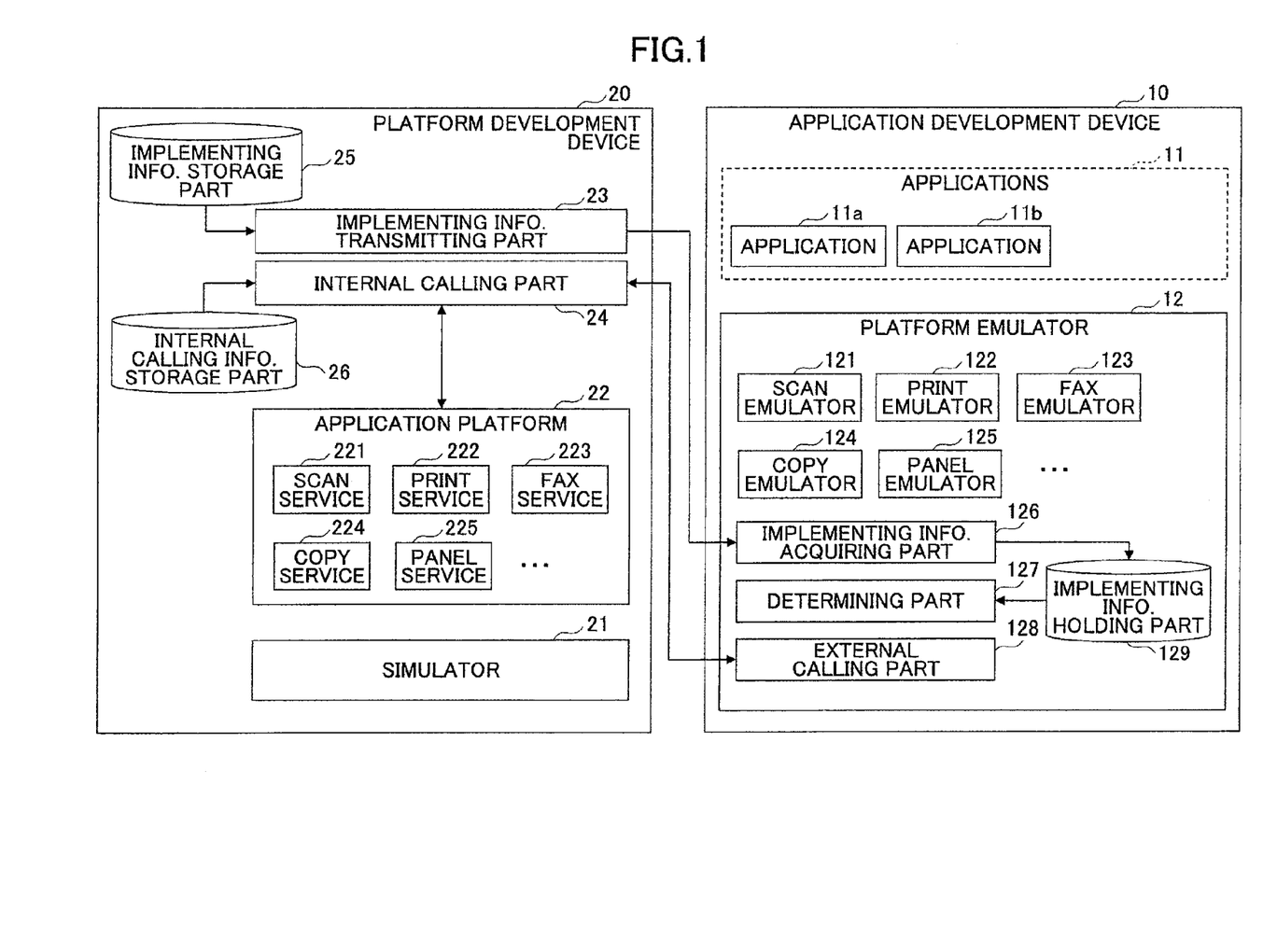
FIG. 1 is a block diagram illustrating the composition of an information processing system of a first embodiment of the present disclosure.

FIG. 1 illustrates the composition of an information processing system of a first embodiment of the present disclosure. As illustrated in FIG. 1, a platform development device 20 and an application development device 10 are connected to each other via a network, such as the Internet or a LAN (local area network).

The platform development device 20 is a computer, such as PC (personal computer), which is used to facilitate the development of an application platform of an image forming device. This application platform is a software program which facilitates the development of applications and provides the execution environment of applications on the image forming device.

The APIs (application programming interfaces) of an application platform 22 in the platform development device 20 are made public. Using the APIs enables a third vendor to carry out the development of applications.

As illustrated in FIG. 1, the platform development device 20 includes a simulator 21, an application platform 22, an implementing information transmitting part 23, an internal calling part 24, an implementing information storage part 25, and an internal calling information storage part 26.

The simulator 21 is a software program for enabling the platform development device 20 to operate on an upper-level software program (which is, in this embodiment, the application platform 22) similar to the way the image forming device (multifunctional peripheral) operates on the upper-level software program. For example, the simulator 21 provides to the upper-level software program the interfaces that are equivalent to interfaces related to device drivers which control one or more of hardware resources (including an operation panel, a scanner, a printer, etc.) intrinsic to the image forming device. The simulator 21 performs a simulation process similar to the way the original device driver performs the process in response to an interface calling request.

The application platform 22 is an application platform in the middle of development, which is to be installed in an image forming device. As illustrated in FIG. 1, the application platform 22 includes a scan service 221, a print service 222, a fax service 223, a copy service 224, a panel service 225, etc. The scan service 221 is a program module which provides an API (interface) related to execution of a scanning process. The print service 222 is a program module which provides an API related to execution of a printing process. The copy service 224 is a program module which provides an API related to execution of a copying process. The panel service 225 is a program module which provides an API related to control of the operation panel.

The implementing information transmitting part 23 transmits the implementing information, currently stored in the implementing information storage part 25, to the application development device 10. The implementing information is a list of information items of the APIs implemented on the application platform 22. Because the application platform 22 is in the middle of development, the APIs implemented on the application platform 22 are changed on a day-to-day basis. In accordance with the changes to the application platform 22, the implementing information in the implementing information storage part 25 is updated. The implementing information storage part 25 is a storage area (for example, a file) of a nonvolatile storage medium of the platform development device 20 where the implementing information is stored.

In response to an API calling request received from the application development device 10, the internal calling part 24 calls an API (or an API of the application platform 22) specified in the API calling request, based on the internal calling information stored in the internal calling information storage part 26. The internal calling part 24 transmits, to the application development device 10, a response containing the information indicating a result (or a return value) of the process performed by the called API. The internal calling information is provided for every API and contains both identification information (for example, a method name) of the API and address information of the API indicating a location of the API in the application platform 22 and associated with the API identification information.

The internal calling information storage part 26 is a storage area (for example, a file) of the nonvolatile storage medium of the platform development device 20 where the internal calling information is stored.

The application development device 10 is a computer, such as PC (personal computer), which is used to facilitate the development of applications 11 which operate on the application platform 22 (or using the application platform 22). As illustrated in FIG. 1, the application development device 10 includes the applications 11 and a platform emulator 12.

The applications 11 are applications in the middle of development, which are to be installed in an image forming device. As illustrated in FIG. 1, the applications 11 include an application 11a and an application 11b.

The platform emulator 12 is an emulator of the application platform 22. Specifically, the platform emulator 12 includes the APIs which are equivalent to the APIs in the application platform 22, and emulates operation of an original API in response to an API calling request from any of the applications 11. It is not necessary that the kinds of the APIs provided in the platform emulator 12 are exactly in agreement with the kinds of the APIs provided in the application platform 22. For example, the platform emulator 12 may include APIs which have not been implemented on the application platform 22.

As illustrated in FIG. 1, the platform emulator 12 includes a scan emulator 121, a print emulator 122, a fax emulator 123, a copy emulator 124, a panel emulator 125, an implementing information acquiring part 126, a determining part 127, an external calling part 128, and an implementing information holding part 129.

The scan emulator 121 is an emulator of the scan service 221, the print emulator 122 is an emulator of the print service 222, the fax emulator 123 is an emulator of the fax service 223, the copy emulator 124 is an emulator of the copy service 224, and the panel emulator 125 is an emulator of the panel service 225. These emulators are directly called and used by any of the applications 11.

The implementing information acquiring part 126 receives the implementing information from the implementing information transmitting part 23 of the platform development device 20, and stores the received implementing information into the implementing information holding part 129. The implementing information holding part 129 is a storage area of a storage medium of the application development device 10 where the implementing information is stored.

The determining part 127 determines whether an API called from the application 11 is already implemented on the application platform 22, based on the implementing information stored in the implementing information holding part 129.

The external calling part 128 transmits, when it is determined by the determining part 127 that the API called from the application is implemented on the application platform 22, an API calling request (or a request of execution of the API) to the internal calling part 24 of the platform development device 20. In the API calling request, the API identification information (for example, a method name of the API) is specified.

Figure 2:
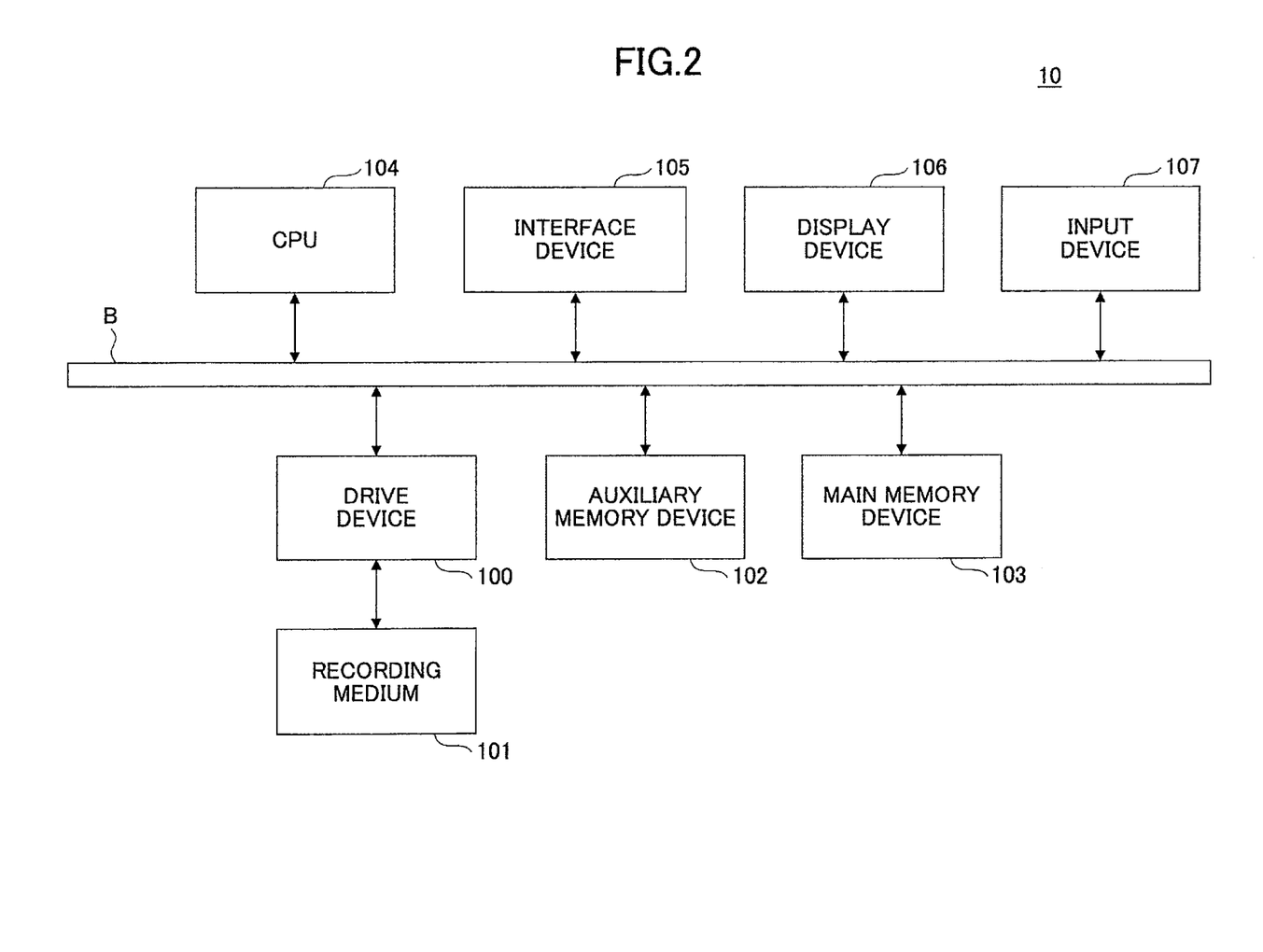
FIG. 2 is a block diagram illustrating the hardware composition of an application development device in an embodiment of the present disclosure.

FIG. 2 illustrates the hardware composition of an application development device in an embodiment of the present disclosure. As illustrated in FIG. 2, the application development device 10 includes a drive device 100, an auxiliary memory device 102, a main memory device 103, a CPU 104, an interface device 105, a display device 106, and an input device 107, which are interconnected by a bus B.

A program which, when executed by the CPU 104, causes the CPU 104 to execute a process in the application development device 10 is provided by means of a recording medium 101, such as CD-ROM. If the recording medium 101 storing the program is set in the drive device 100, the program from the recording medium 101 is installed in the auxiliary memory device 102 through the drive device 100. However, the installation of the program in the application development device 10 is not limited to the above method using the recording medium 101. Alternatively, the program may be downloaded to the application development device 10 from another computer via the network.

The auxiliary memory device 102 stores the program installed therein and also stores the necessary files, data, parameters, etc.

The program is read out from the auxiliary memory device 102, when a program starting command takes place, and stored in the main memory device 103. The CPU 104 carries out the functions of the application development device 10 in accordance with the program stored in the main memory device 103. The interface device 105 is used to provide an interface for connecting the application development device 10 with the network. The display device 106 displays GUIs (graphical user interface) in accordance with the program. The input device 107 includes a keyboard, a mouse, etc., which are used by an operator to input various operational instructions.

The platform development device 20 may have the hardware composition which is essentially the same as that of the application development device 10 illustrated in FIG. 2, and a description thereof will be omitted. However, the actual image forming device may be used as the platform development device 20. In such a case, the simulator 21 in the platform development device 20 is unnecessary.

Next, the procedure which is performed by the information processing system of FIG. 1 will be described.

Figure 3:
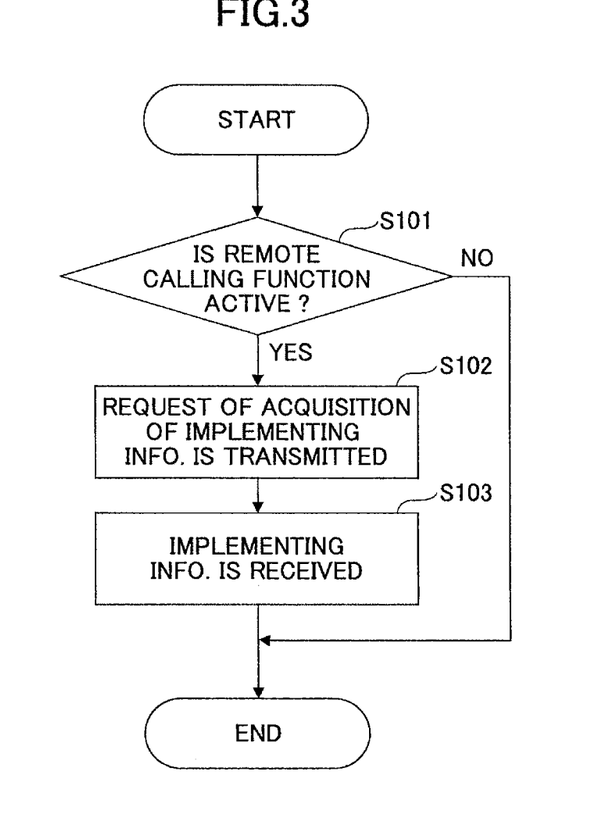
FIG. 3 is a flowchart for explaining the procedure which is performed when a platform emulator is started.

FIG. 3 is a flowchart for explaining the procedure which is performed by the information processing system of FIG. 1 when the platform emulator is started.

When the platform emulator 12 is started, the implementing information acquiring part 126 determines whether the remote calling function is active in the application development device 10 (S101). The remote calling function is a function to perform the remote calling of an API of the application platform 22. The determination as to whether the remote calling function is active or inactive is made depending on the content of setting information stored in a predetermined setup file. Namely, the user can switch the state of the remote calling function between an active state and an inactive state by editing the setting information in the predetermined setup file.

When it is determined in step S101 that the remote calling function is active, the implementing information acquiring part 126 transmits a request of acquisition of the implementing information to the implementing information transmitting part 23 of the platform development device 20 (S102). In this case, the identification information (for example, an IP address or URL (uniform resource locator)) of a destination device to which the request of acquisition is transmitted may be stored beforehand in a predetermined setup file (or a predetermined storage location of in the auxiliary memory device 102).

In response to the received request of acquisition, the implementing information transmitting part 23 transmits the implementing information, currently stored in the implementing information storage part 25, to the implementing information acquiring part 126. The implementing information acquiring part 126 receives the implementing information from the implementing information transmitting part 23 and stores the received implementing information into the implementing information holding part 129 (S103).

Figure 4A:
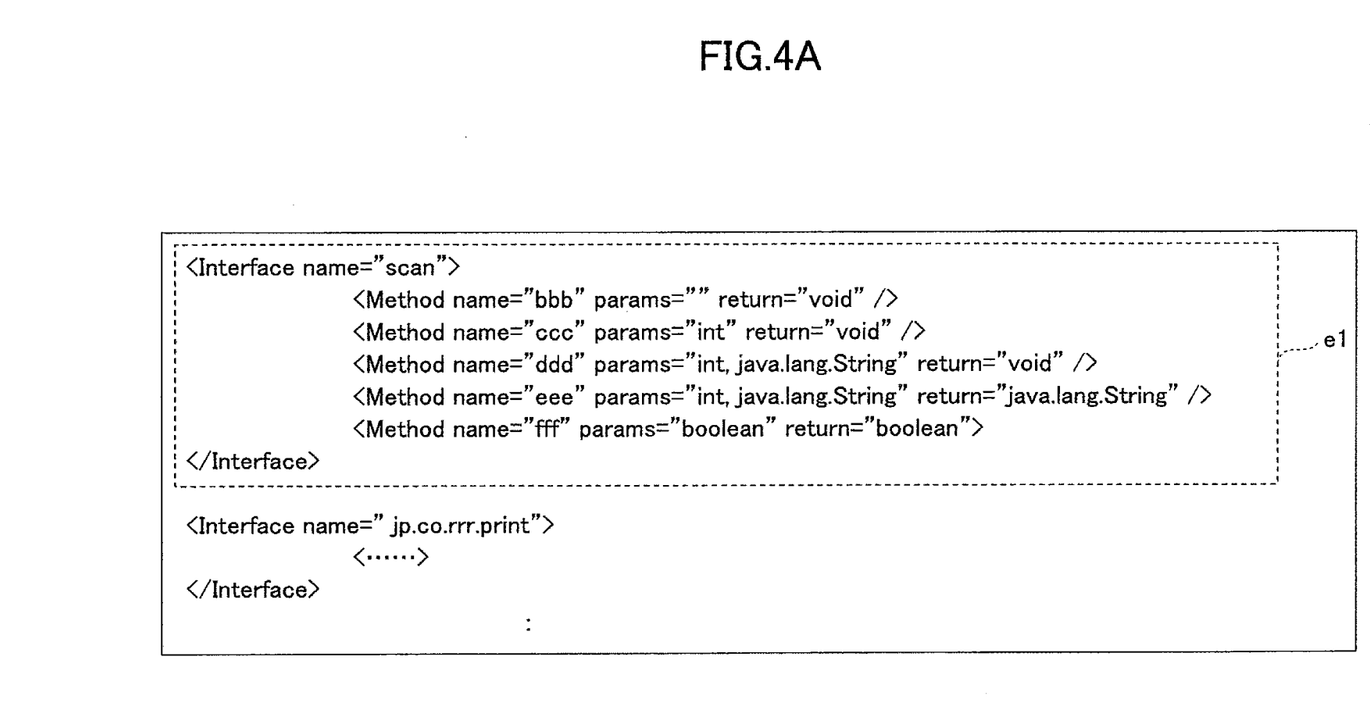
FIG. 4A and FIG. 4B are diagrams for explaining examples of implementing information.
Figure 4B:
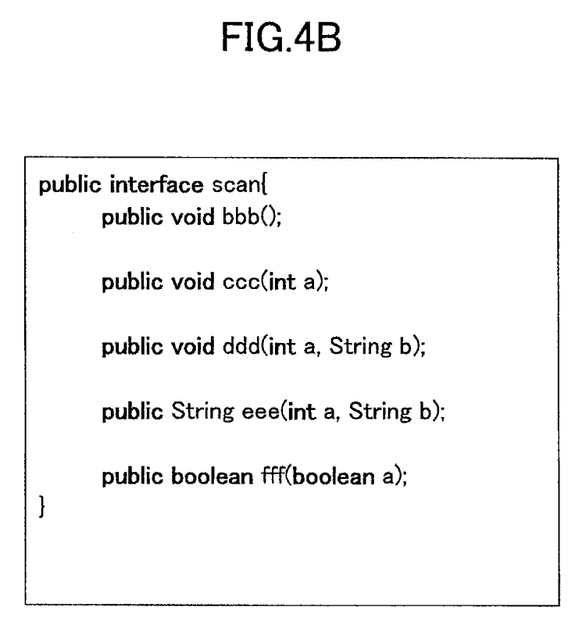

FIG. 4A and FIG. 4B are diagrams for explaining examples of the implementing information. In FIG. 4A, an example of the implementing information which is written in an XML (extensible markup language) format is illustrated.

The format in which the implementing information is written is not limited to the XML format. Alternatively, it may be written in a CSV (Comma Separated Values) format or another format.

The implementing information of FIG. 4A contains a set of interface elements, each surrounded by the <Interface> tag, and the set of interface elements is provided for each of the services (such as the scan service 221, the print service 222, etc.) already implemented on the application platform 22. Each interface element contains a name attribute. A corresponding one of the services is identified by the value of its name attribute. For example, the value of the name attribute of the interface element "el" is set to "scan". Therefore, it can be easily understood that the interface element indicates the state of implementation of the scan service 221.

Each Interface element contains a set of method elements as child elements for each of the methods already implemented with respect to the corresponding service. Each method element includes a name attribute, a parameter attribute, a return attribute, etc. The value of the name attribute indicates a method name. The value of the parameter attribute indicates the data type of the argument. The value of the return attribute indicates the data type of the return value.

FIG. 4B illustrates an example of the implementing information in which the definition of the interface element el is written by the programming language. As illustrated in FIG. 4B, the interface element el is described so that a (bbb) method, a (ccc) method, a (ddd) method, an (eee) method, and an (fff) method are implemented as scan interfaces (or the APIs of the scan service 221). The term "implemented" is used when the definition of the interface element is described in a manner that at least the process in the method element can be tested. The term "implemented" is not applicable for a case in which there is no method implemented.

On the other hand, when it is determined in step S101 that the remote calling function is inactive, acquisition of the implementing information is not performed. Then, the procedure as illustrated in FIG. 3 is terminated.

Even after the platform emulator 12 is started, the implementing information acquiring part 126 performs the procedure of FIG. 3 at a predetermined timing. For example, the implementing information acquiring part 126 may be arranged to perform the procedure of FIG. 3 periodically or upon receipt of a request of execution input from the user. Accordingly, in accordance with the progress of the development of the application platform 22 in the platform development device 20, the implementing information stored in the implementing information holding part 129 will be updated. Alternatively, the implementing information transmitting part 23 may be arranged to actively distribute the implementing information immediately after the implementing information in the implementing information storage part 25 is updated.

Next, the procedure which is performed by the information processing system of FIG. 1 when an API of the platform emulator 12 is called will be described. For the sake of convenience, a case in which an API of the scan emulator 122 is called will be described.

Figure 5:
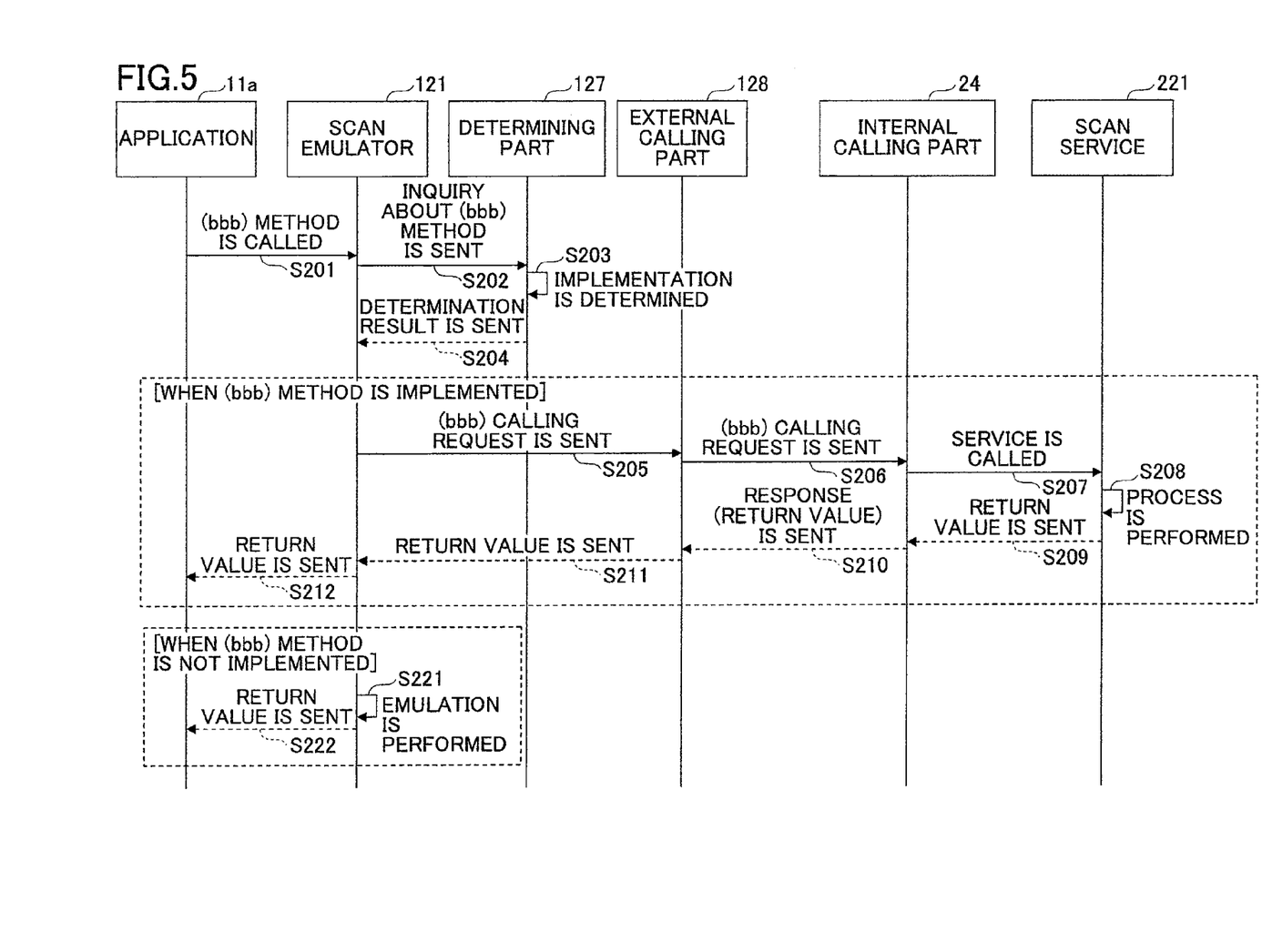
FIG. 5 is a sequence diagram for explaining the procedure which is performed by the information processing system of the first embodiment in response to the call of the API of a scan emulator.

FIG. 5 is a sequence diagram for explaining the procedure which is performed by the information processing system of the first embodiment in response to the call of the API of the scan emulator. In this embodiment, it is supposed that the application 11a has called the (bbb) method of the scan emulator 121 during the testing of the application 11a (S201).

In response to the call, the (bbb) method of the scan emulator 121 sends an inquiry about the implementation of the (bbb) method ("scan.bbb( )") in the scan service 221 to the determining part 127 (S202). The determining part 127 accesses the implementing information currently stored in the implementing information holding part 129 and determines whether the (bbb) method of the scan service 221 is implemented (or determines whether the (bbb) method is already implemented on the application platform 22) (S203).

Specifically, it is determined in step S203 whether the method element with the name attribute whose value is "bbb" is included in the implementing information as a child element of the interface element with the name attribute whose value is "scan". When the method element is included in the implementing information, the determining part 127 determines that the (bbb) method of the scan service 221 is implemented. When the method element is not included therein, the determining part 127 determines that the (bbb) method of the scan service 221 is not implemented. The determining part 127 sends a result of the determination to the scan emulator 121 (S204).

When the result of the determination from the determining part 127 indicates that the (bbb) method of the scan service 221 is implemented, the (bbb) method of the scan emulator 121 sends a request of calling of the (bbb) method of the scan service 221 to the external calling part 128 (S205). The external calling part 128 transmits a (bbb) method calling request (in which a service name (interface name) and a method name are specified) to the internal calling part 24 of the platform development device 20 based on the identification information (an IP address or URL) of the calling device which is set up beforehand and stored in the auxiliary memory device 102 (S206).

Subsequently, the internal calling part 24 sends a call of the (bbb) method, corresponding to the method name specified in the received calling request, to the scan service 221, corresponding to the service name specified in the received calling request (S207). The internal calling part 24 determines the address information of the (bbb) method of the scan service 221 based on the internal calling information stored in the internal calling information storage part 26. In this case, the dynamic calling (or the dynamic linking) of the method according to the related art may be used. Depending on the related art technology being used, the internal calling information storage part 26 is not directly edited or described by a developer, and the internal calling information storage part 26 may be built in or concealed in the internal calling part 24.

Subsequently, in response to the call, the (bbb) method of the scan service 221 performs the process implemented therein (S208). The (bbb) method of the scan service 221 sends a return value (a result of the process) back to the internal calling part 24 (S209). The internal calling part 24 transmits a response including the return value to the external calling part 128 (S210). The external calling part 128 sends the return value included in the received response, to the scan emulator 121 (S211). The (bbb) method of the scan emulator 121 sends the return value to the application 11a (S212).

On the other hand, when the result of the determination from the determining part 127 indicates that the (bbb) method of the scan service 221 is not implemented, the (bbb) method of the scan emulator 121 performs the process implemented therein and emulates operation of the scan service 221 (S221). Subsequently, the (bbb) method of the scan emulator 121 sends a return value indicating a result of the emulation, to the application 11a (S222).

When a response to the remote call of the (bbb) method is not received from the platform development device 20 via the external calling part 128 (or when the waiting time for receiving a response exceeds a time-out period), the (bbb) method of the scan emulator 121 performs the steps S221 and S222 in the procedure of FIG. 5. For example, such problems may arise when a failure has occurred in the network, when the platform development device 20 is not started, or when the application platform 22 in the platform development device 20 does not operate normally.

As described above, according to the first embodiment, it is possible for the developer of the application 11 to make use of the application platform 22 when checking the operation of the application 11. Therefore, both the developer of the application 11 and the developer of the application platform 22 can perform the development work or the testing efficiently. Namely, the developer of the application 11 can perform the testing of the operation of the application 11 on the actual application platform 22. The developer of the application platform 22 can perform the testing of the operation of the application platform 22 in connection with the testing of the operation of the application 11.

According to the first embodiment, it is not necessary to supply the software substance of the application platform 22 to the developer of the application 11. Therefore, the supplier of the application platform 22 is able to prevent the outflow of the software properties.

According to the first embodiment, the implementation of an API is determined for each API, and when the API is implemented, the application platform 22 is utilized remotely. On the other hand, when the API is not implemented, the emulation is performed. Accordingly, the development work of the application platform 22 and the development work of the application 11 can be carried out smoothly and concurrently.

Next, a second embodiment of the present disclosure will be described. The information processing system of the second embodiment is arranged to include a mechanism for displaying a display component or a display screen (either of which will be called a display component) on the display device 106 of the application development device 10 in response to the call of the panel emulator 125.

If the procedure of FIG. 5 is simply performed with respect to the panel emulator 125 (in which the scan emulator 121 is replaced with the panel emulator 125 and the scan service 221 is replaced with the panel service 225), the displaying process based on a display command (or a method calling request) to the panel emulator 125 will be performed by the platform development device 20. The display command to the panel emulator 125 will be transmitted to the panel service 225, but the panel service 225 is inherently provided to perform the displaying process on the local display device (or the operation panel of the image forming device).

Figure 6:
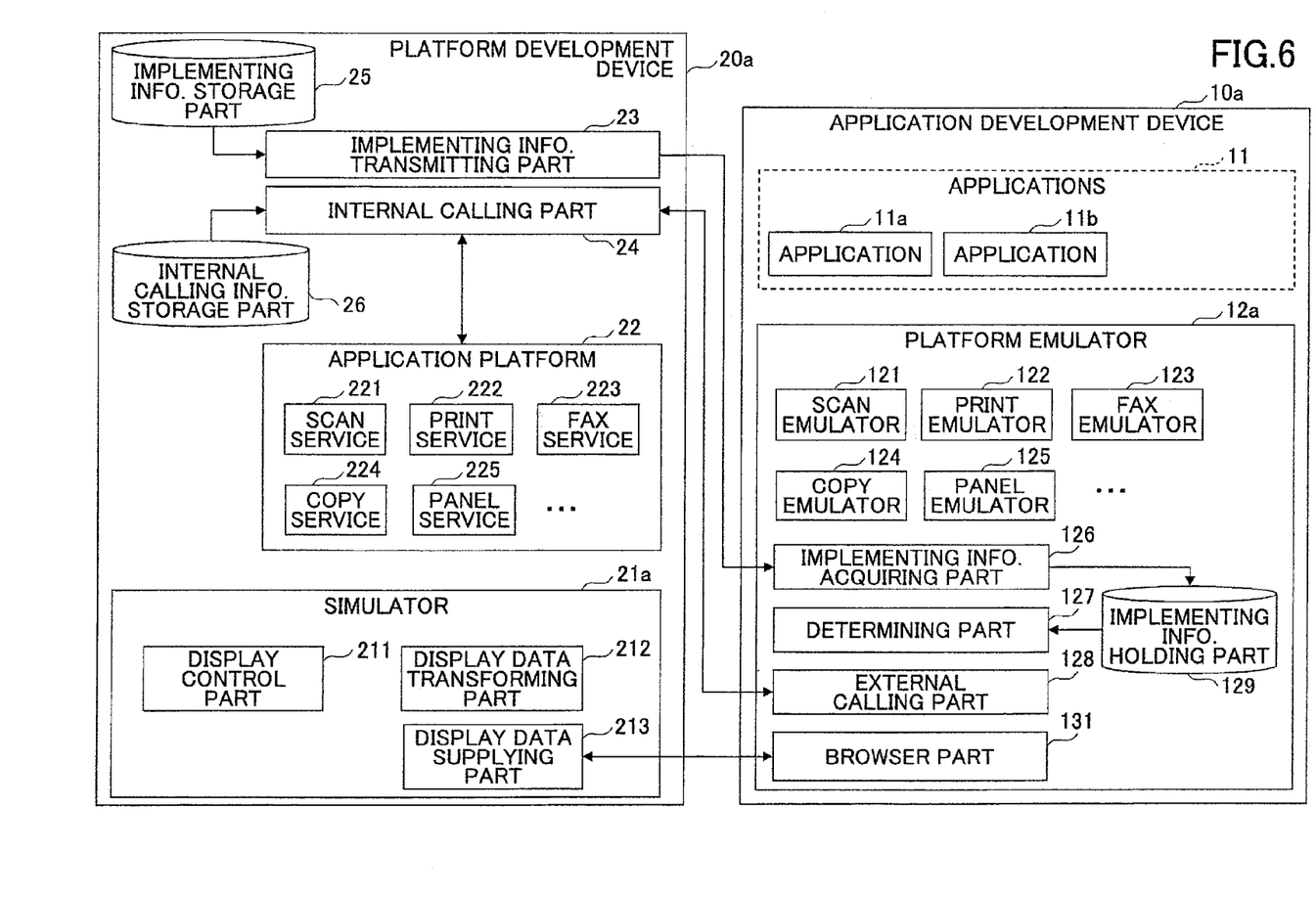
FIG. 6 is a block diagram illustrating the composition of an information processing system of a second embodiment of the present disclosure.

In order to avoid the problem, the information processing system of the second embodiment is arranged to have the composition as illustrated in FIG. 6. FIG. 6 illustrates the composition of the information processing system of the second embodiment. In FIG. 6, the elements which are the same as corresponding elements in FIG. 1 are designated by the same reference numerals, and a description thereof will be omitted.

As illustrated in FIG. 6, a simulator 21a of a platform development device 20a includes a display control part 211, a display data transforming part 212, and a display data supplying part 213.

The display control part 211 is a simulator of a program module which performs control for displaying a display component on the operation panel of the local image forming device based on the data (display data) which indicates the display component generated by the panel service 225.

The display data transforming part 212 transforms the display data generated by the panel service 225 into data in a format that is appropriate for transmission of the data over the network. In this embodiment, the HTML (hypertext markup language) format which is a data format that is appropriate for transmission of the data over the network is used. Alternatively, other data formats different from the HTML format, such as JPEG (joint photographic experts group), BITMAP, and PDF (portable document format), may be used instead.

The display data supplying part 213 enables accessing of the HTML data generated by the display data transforming part 212 via the network. Specifically, the display data supplying part 213 provides a function as a Web server and associates the HTML data with a predetermined URL (uniform resource locator) to manage the HTML data. In response to a GET request to the predetermined URL, the display data supplying part 213 sends an HTTP response including the HTML data to the device with the predetermined URL.

On the other hand, a platform emulator 12a of an application development device 10a further includes a browser part 131. The browser part 131 receives the HTML data generated by the display data transforming part 212, from the platform development device 20a, and displays the HTML data on the display device 106.

Next, the procedure which is performed by the information processing system of the second embodiment will be described.

Figure 7:
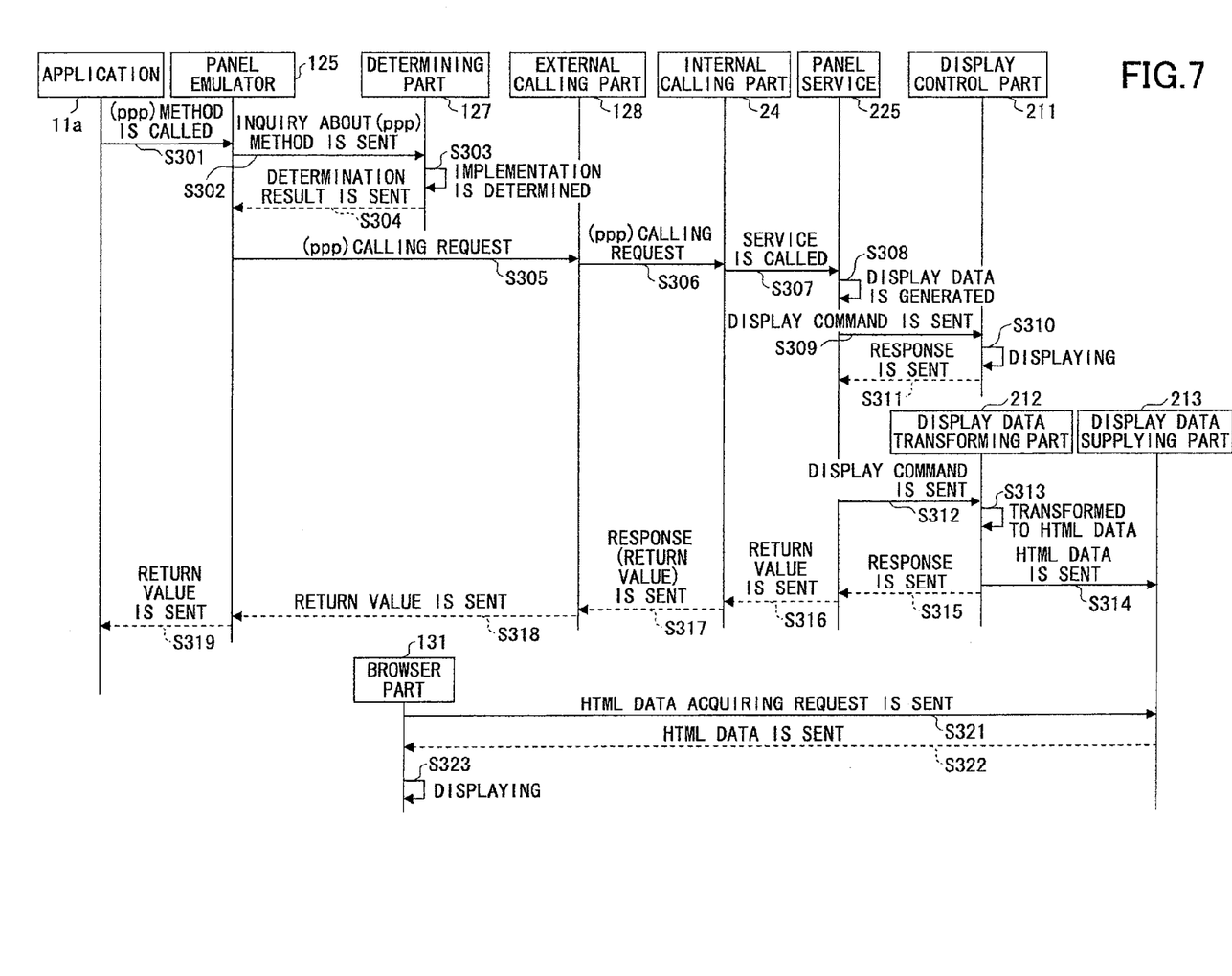
FIG. 7 is a sequence diagram for explaining the procedure which is performed by the information processing system of the second embodiment in response to the call of the API of a panel emulator.

FIG. 7 is a sequence diagram for explaining the procedure which is performed by the information processing system of the second embodiment in response to the call of the API of the panel emulator.

As illustrated in FIG. 7, it is supposed in this embodiment that the application 11a has called a (ppp) method of the panel emulator 125 during the testing of the application 11a (S301). It is supposed that the (ppp) method is equivalent to a display command of a certain display component.

In the procedure of FIG. 7, steps S302 to S307 are the same as the corresponding steps S202 to S207 in the procedure of FIG. 5, and a description thereof will be omitted. In the procedure of FIG. 7, the steps which are to be performed when the (ppp) method is not implemented are self-explanatory in view of the corresponding steps S221 and S222 in the procedure of FIG. 5, and a description thereof will be omitted. In the following, the procedure which is performed by the information processing system of the second embodiment when the (ppp) method is implemented will be described.

In response to the call, the (ppp) method of the panel service 225 generates display data of a display component corresponding to the (ppp) method (S308). Subsequently, the (ppp) method of the panel service 225 sends a display command containing the generated display data to the display control part 211 (S309). In accordance with the display command, the display control part 211 displays the display component on the display device of the platform development device 20 based on the display data (S310).

Subsequently, the display control part 211 sends a response to the display command to the (ppp) method of the panel service 225 (S311). The (ppp) method sends a display command containing the generated display data to the display data transforming part 212 (S312). In accordance with the display command, the display data transforming part 212 transforms the display data into HTML data (S313).

Subsequently, the display data transforming part 212 sends the HTML data generated by the transform processing, to the display data supplying part 213 (S314). The display data supplying part 213 associates the received HTML data with a predetermined URL, and stores the HTML data in the storage medium of the platform development device 20.

Subsequently, the display control part 211 sends a response to the display command in step S312 to the (ppp) method of the panel service 225 (S315).

In the procedure of FIG. 7, steps S316 to S319 are the same as corresponding steps S209 to S212 in the procedure of FIG. 5, and a description thereof will be omitted.

On the other hand, the browser part 131 of the application development device 10 periodically transmits a request of acquisition (GET request) of HTML data to the predetermined URL (S321). That is, the browser part 131 performs polling to the predetermined URL. For example, the predetermined URL is stored beforehand in the auxiliary memory device 102.

The display data supplying part 213 receives the request of acquisition from the browser part 131. When the HTML data associated with the predetermined URL do not exist, the display data supplying part 213 sends a response (HTTP response) indicating that the HTML data do not exist, to the browser part 131.

When the HTML data associated with the predetermined URL exist, the display data supplying part 213 sends a response containing the HTML data, to the browser part 131 (S322). After the response containing the HTML data is sent, the display data supplying part 213 deletes the HTML data in the storage medium.

When the response containing the HTML data is received, the browser part 131 displays the display component on the display device 106 based on the HTML data (S323).

Alternatively, the period of the polling to the predetermined URL performed by the browser part 131 may be restricted after the method of the panel emulator 125 is called. For example, when the object of the determination in step S303 is a method related to the panel service 225, the determining part 127 may generate corresponding data (for example, a file) that indicating the object of the determination as being the method related to the panel service 225, and store the data in the auxiliary memory device 102. On the other hand, the browser part 131 defers the generation of the data.

For example, the browser part 131 performs the polling to detect that the corresponding data have been generated. When it is detected that the corresponding data have been generated, the browser part 131 deletes the corresponding data and starts the polling to the predetermined URL. When the HTML data are acquired as a result of the polling, the browser part 131 terminates the polling to the predetermined URL. Because the period of the polling to the predetermined URL is restricted, it is possible to prevent the amount of traffic transmitted over the network from being increased.

Alternatively, the browser part 131 may not be a dedicated browser for use in the platform emulator 12*a*. For example, a general-purpose Web browser (which will be called a Web browser) may be used instead of the browser part 131. The function to perform the polling to the predetermined URL is not beforehand implemented on the Web browser. Hence, when the Web browser is used instead, a web page (HTML data) in which a script program which causes the Web browser to perform the polling to the predetermined URL is embedded may be downloaded beforehand from the display data supplying part 213 to the Web browser. If the web page is downloaded to the Web browser and the Web browser is caused to execute the script program, the Web browser can perform the function that the same as the function of the browser part 131.

The necessity of the displaying by the platform development device 20 may be set up beforehand. For example, the information indicating the necessity of the displaying may be stored in the storage medium of the platform development device 20. When the stored information indicates that the displaying is unnecessary, the panel service 225 does not send the display command in step S309 in the procedure of FIG. 7.

Similarly, the necessity of the displaying by the application development device 10 may be set up beforehand. For example, the information indicating the necessity of the displaying is stored beforehand in the auxiliary memory device 102 of the application development device 10. When the stored information indicates that the displaying is unnecessary, the browser part 131 does not perform the polling to the predetermined URL. When the Web browser is used instead of the browser part 131, the Web browser may be arranged so that the Web browser is not started. Even if the Web browser is started, it may be arranged so that the web page in which the script program for performing the polling to the predetermined URL is embedded is not downloaded.

As described in the foregoing, according to the second embodiment, a display component can be displayed on the application development device 10 based on the display command using the API of the panel emulator 125. Therefore, the checking of a GUI (graphical user interface) can be performed by the application development device 10.

Figure 8:
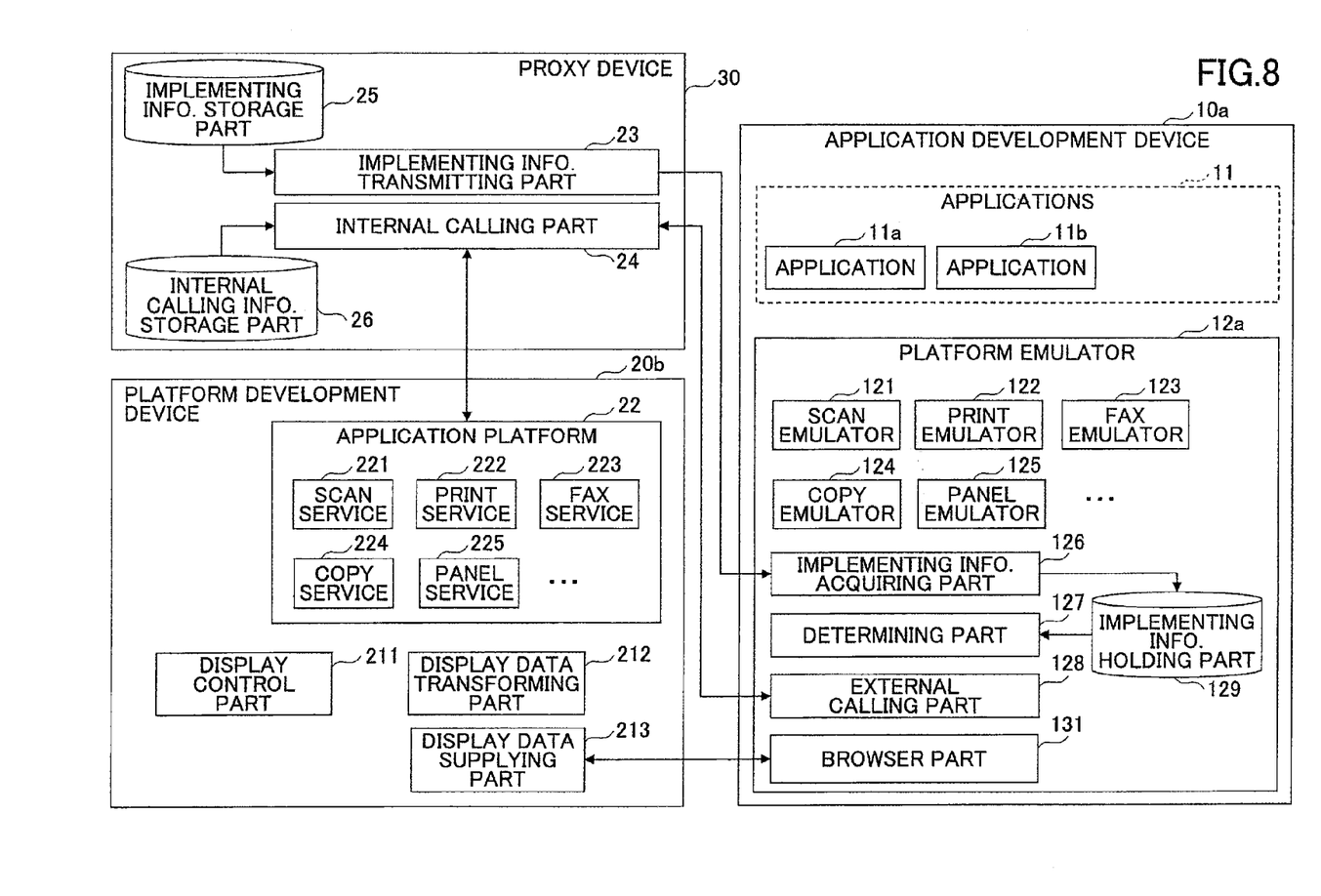
FIG. 8 is a block diagram illustrating the composition of an information processing system of a third embodiment of the present disclosure.

Next, a third embodiment of the present disclosure will be described. FIG. 8 illustrates the composition of an information processing system of the third embodiment.

In FIG. 8, the elements which are the same as corresponding elements in FIG. 6 are designated by the same reference numerals, and a description thereof will be omitted.

As illustrated in FIG. 8, a proxy device 30 is another computer different from the platform development device 20*b*, and the implementing information transmitting part 23, the internal calling part 24, the implementing information storage part 25, and the internal calling information storage part 26 are implemented on the proxy device 30.

When the platform development device 20*b* is an image forming device, the composition of the platform development device 20*b* illustrated in FIG. 8 is desired. That is, the respective parts implemented on the proxy device 30 are not contained in the image forming device shipped to the user. By separating the portion of the proxy device 30 from the image forming device, the application platform on the image forming device having the same composition at the time of shipment can be developed by using the proxy device 30.

The procedure which is performed by the information processing system of the third embodiment is self-explanatory in view of the procedure of FIG. 5 or FIG. 7, and a description thereof will be omitted.

According to the present disclosure, the efficiency of the development work of both an application platform of an image forming device and an application which operates on the application platform can be increased appropriately.

The present disclosure is not limited to the above-described embodiments, and variations and modifications may be made without departing from the scope of the present disclosure.

What is claimed is:

1. An information processing system, comprising:
   a platform development device including a program including application programming interfaces called by applications of an image forming device; and
   an application development device connected to the platform development device via a network, the application development device including an emulator that emulates a process performed by the image forming device caused by the program, the emulator including circuitry configured to:
      receive implementation information indicating application programming interfaces implemented in the program of the platform development device from the platform development device via the network;
      determine, in response to an interface calling request from an application that uses the emulator, whether an application programming interface is implemented in the platform development device based on the received implementation information;
      transmit a request of execution of the application programming interface to the platform development device via the network when a result of the determination indicates that the application programming interface is implemented in the platform development device; and perform emulation of the application programming interface called by the application when the result of the determination indicates that the application programming interface is not implemented in the platform development device.

2. The information processing system according to claim 1, wherein the circuitry is configured to receive new implementation information indicating application program interfaces implemented in the program of the platform development device from the platform development device via the network at a predetermined timing after the implementation information has been received, and update the implementation information by the new implementation information.

3. The information processing system according to claim 1, wherein the emulator is configured to emulate the application programming interface called by the application when a response to the transmitted request of execution is not received from the platform development device.

4. The information processing system according to claim 1, wherein the circuitry is configured to receive, from the platform development device, display data generated in the platform development device in response to the request of execution of the application programming interface, and to display the received display data on a display.

5. The information processing system according to claim 1, wherein the platform development device includes other circuitry configured to:

transmit the implementation information to the application development device via the network; and call the application programming interface in the program of the platform development device in response to the request of execution received from the application development device, and transmit to the application development device a response containing a result of a process performed by the application programming interface.

6. An information processing method performed by an information processing system including a platform development device including a program including application programming interfaces called by applications of an image forming device and an application development device connected to the platform development device via a network, the application development device including an emulator that emulates a process performed by the image forming device caused by the program, the information processing method comprising:

receiving, by the application development device, implementation information indicating application programming interfaces implemented in the program of the platform development device from the platform development device via the network;

determining, by the application development device, in response to an interface calling request from an application that uses the emulator, whether an application programming interface is implemented in the platform development device based on the received implementation information;

transmitting, by the application development device, a request of execution of the application programming interface to the platform development device via the network when a result of the determination indicates that the application programming interface is implemented in the platform development device; and performing, by the application development device, emulation of the application programming interface called by the application when the result of the determination indicates that the application programming interface is not implemented in the platform development device.

7. The information processing method according to claim 6, further comprising:

receiving, by the application development device, new implementation information indicating application programming interfaces implemented in the program of the platform development device from the platform development device via the network at a predetermined timing after the implementation information has been received; and updating the implementation information by the new implementation information.

8. The information processing method according to claim 6, further comprising:

performing, by the application development device, emulation of the application programming interface called by the application when a response to the request of execution transmitted by the application development device is not received from the platform development device.

9. The information processing method according to claim 6, further comprising:

receiving, by the application development device from the platform development device, display data generated in the platform development device in response to the request of execution of the application programming interface received from the application development device so that the received display data is displayed on a display.

10. The information processing method according to claim 6, further comprising:

transmitting, by the platform development device, the implementation information to the application development device via the network; and calling, by the platform development device, the application programming interface in the program of the platform development device in response to the request of execution received from the application development device so that a response containing a result of a process performed by the application programming interface is transmitted to the application development device.

11. A non-transitory computer-readable storage medium including computer-readable instructions that, when executed on a computer, cause the computer to execute an information processing method in an information processing system including a platform development device including a program including application programming interfaces called by applications of an image forming device, and an application development device connected to the platform development device via a network, the application development device including an emulator that emulates a process performed by the image forming device caused by the program, the information processing method comprising:

receiving, by the application development device, implementation information indicating application programming interfaces implemented in the program of the platform development device from the platform development device via the network;

determining, by the application development device, in response to an interface calling request from an application that uses the emulator, whether an application programming interface is implemented in the platform development device based on the received implementation information;

transmitting, by the application development device, a request of execution of the application programming interface to the platform development device via the network when a result of the determination indicates that the application programming interface is implemented in the platform development device; and performing, by the application development device, emulation of the application programming interface called by the application when the result of the determination indicates that the application programming interface is not implemented in the platform development device.

12. The information processing system according to claim 1, wherein the circuitry is configured to cause a program module of the platform development device to execute a process implemented in the platform development device when the result of the determination indicates that the application programming interface is implemented in the platform development device.

13. The information processing system according to claim 12, wherein the circuitry is configured to receive a result of execution of the process implemented in the platform development device from the platform development device when the result of the determination indicates that the application programming interface is implemented in the platform development device.

14. The information processing system according to claim 1, wherein when the application programming interface is implemented in the platform development device, a notification of the result of execution of the process implemented in the platform development device is sent to the application, and wherein when the application programming interface is not implemented in the platform development device, a notification of a result of performance of the emulation by the emulator is sent to the application.

* * * * *